United States Patent [19]
Wakamatsu

[11] Patent Number: 5,987,074
[45] Date of Patent: Nov. 16, 1999

[54] DIGITAL COMMUNICATION DEMODULATOR, DIGITAL COMMUNICATION DEMODULATION METHOD AND DIGITAL DEMODULATION CIRCUIT

[75] Inventor: Masataka Wakamatsu, Kanagawa, Japan

[73] Assignee: Sony Corporation, Tokyo, Japan

[21] Appl. No.: 08/841,566

[22] Filed: Apr. 30, 1997

[30] Foreign Application Priority Data

May 2, 1996 [JP] Japan ..................................... 8-111441

[51] Int. Cl.⁶ .................................................... H04L 27/06
[52] U.S. Cl. ...................... 375/332; 375/344; 455/182.2; 455/185.1; 455/192.2; 348/731; 348/735
[58] Field of Search ..................................... 375/316, 332, 375/340, 344, 377; 455/161.2, 164.1, 164.2, 182.1, 182.2, 185.1, 186.1, 192.2, 3.2; 348/731–733, 735

[56] References Cited

U.S. PATENT DOCUMENTS

| | | | |
|---|---|---|---|
| 5,125,106 | 6/1992 | Kato | 455/182.1 |
| 5,699,384 | 12/1997 | Dillon | 375/316 |
| 5,826,166 | 10/1998 | Brooks et al. | 455/5.1 |
| 5,845,200 | 12/1998 | Suzuki et al. | 455/195.1 |

*Primary Examiner*—Amanda T. Le
*Attorney, Agent, or Firm*—Frommer, Lawrence & Haug, LLP.; William S. Frommer

[57] ABSTRACT

A demodulator and a demodulation method are designed so as to reduce the load of a CPU. A host CPU controls a digital demodulation circuit, an error correction circuit, a transport circuit and an MPEG decoder through a bus. The host CPU outputs a control signal to a format conversion circuit via a CPU interface when it instructs a tuner to perform tuning. The format conversion circuit converts the format of this control signal into a 3-wire format and outputs the converted signal to a frequency divider of the tuner.

21 Claims, 5 Drawing Sheets

DIGITAL COMMUNICATION DEMODULATOR, DIGITAL COMMUNICATION DEMODULATION METHOD AND DIGITAL DEMODULATION CIRCUIT

BACKGROUND OF THE INVENTION

1. Field of the Invention

The present invention relates to a demodulator, a demodulation method and a digital circuit for digital communication and, more particularly, to a digital communication demodulator, a digital communication demodulation method and a digital demodulation circuit designed so as to reduce the load on a central processing unit.

2. Description of the Related Art

FIG. 5 shows the configuration of a conventional receiver for receiving broadcasts via a broadcasting satellite. An antenna 1 receives electric waves from the broadcasting satellite (not shown) and outputs received signals to a converter 2. The converter 2 converts the signals from the antenna 1 into signals having predetermined lower frequencies, and outputs the converted signals to a tuner 3. The tuner 3 is controlled by a host central processing unit (CPU) 8 and receives a signal in a predetermined frequency band from the signals supplied from the converter 2, and outputs the baseband signal of the received signal to a digital demodulation circuit 4. The digital demodulation circuit 4 demodulates the baseband signal input from the tuner 3 in a digital demodulation manner (quadrature phase-shift keying (QPSK) manner) and outputs the demodulated signal to an error correction circuit 5.

The error correction circuit 5 corrects errors in the demodulated digital signal supplied from the digital demodulation circuit 4 by Viterbi decoding, reed solomon decoding or the like and outputs the corrected signal to a transport circuit 6. The transport circuit 6 separates groups of audio data and image data each formed as an independent packet, descrambles the scrambled video data and thereafter outputs the data to a Moving Picture Coding Experts Group (MPEG) decoder 7. The MPEG decoder 7 decodes each of the video data and the audio data encoded by the MPEG system on the broadcasting side, and outputs the decoded data.

The host CPU 8 controls each component according to commands from an input section 9 having switches provided on a front panel of the receiver. The host CPU 8 controls the digital demodulation circuit 4, the error correction circuit 5, the transport circuit 6 and the MPEG decoder 7 through an 8-bit bus by using control signals in a CPU format, which includes a read/write signal, a chip select signal and an address signal.

The tuner 3 is formed of a PLL synthesizer tuner and is controlled with control signals in a three-wire format. In the three-wire format, serial clock, serial data and an enable signal are used. Therefore, the host CPU 8 also generates control signals in the three-wire format other than control signals in the CPU format.

The clock rate with respect to the three-wire format for control of the tuner 3 by the host CPU 8 is a low frequency not higher than the MHz order. Therefore, when the host CPU 8 is controlling the tuner 3 so that the tuner 3 receives a signal in a predetermined frequency hand, it is occupied exclusively in the control of the tuner 3 and cannot control the other circuits.

SUMMARY OF THE INVENTION

In view of these circumstances, an object of the present invention is to provide a demodulator and a demodulation method designed so as to reduce the load of a CPU.

To achieve this object, according to one aspect of the present invention, there is provided a digital demodulator having demodulation means including conversion means for converting the format of one of control signals of control means designating a frequency band extracted by extraction means into a format of the extraction means, and for outputting the format-converted control signal to the extraction means.

According to another aspect of the present invention, there is provided a digital demodulation communication method in which the format of one of control signals of control means designating a frequency band extracted by extraction means is converted into a format of the extraction means, and the format-converted control signal is output to the extraction means.

DESCRIPTION OF THE PREFERRED EMBODIMENTS

Figure 1:
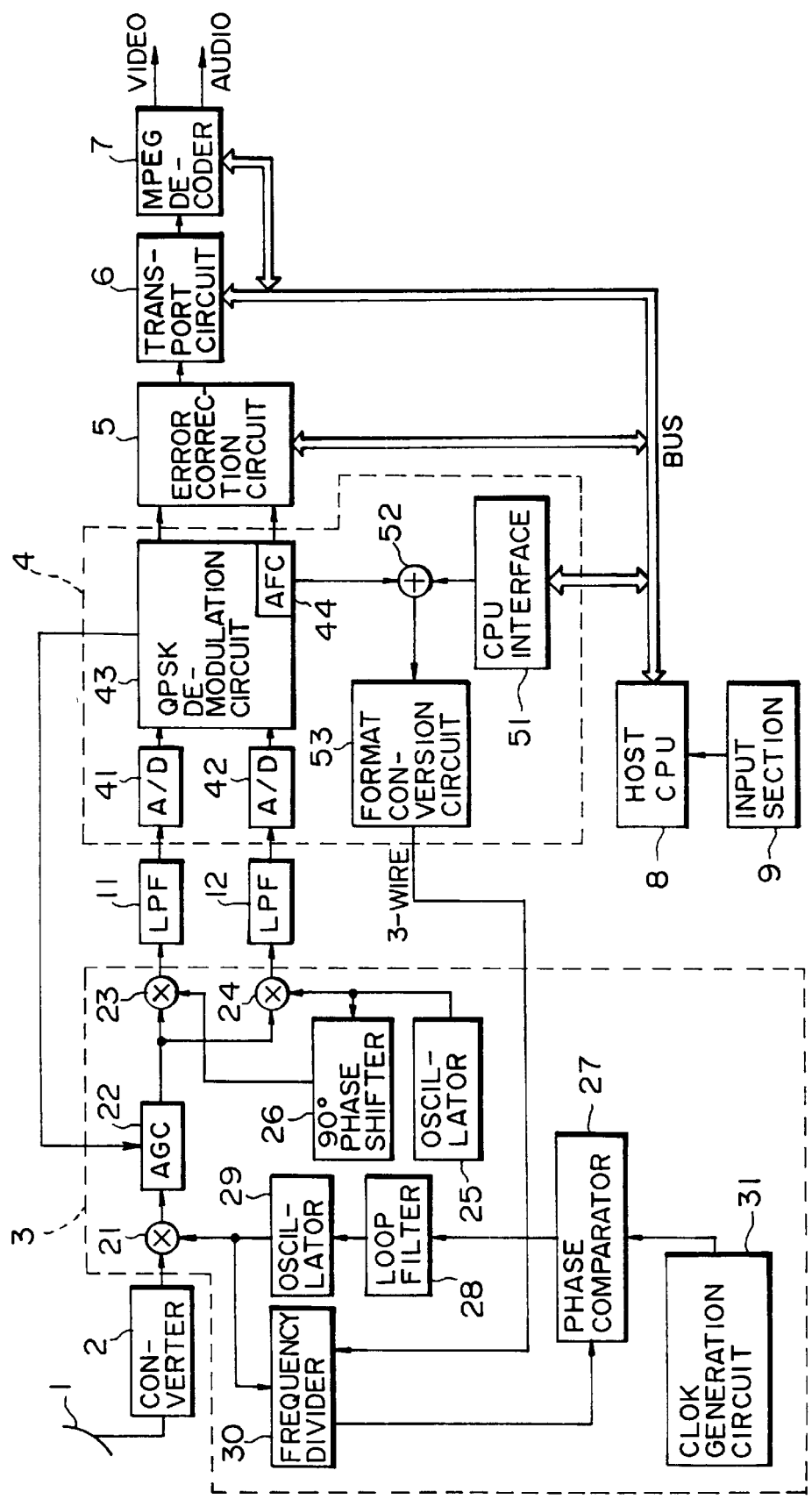
FIG. 1 is a block diagram showing the configuration of a receiver to which a digital communication demodulator of the present invention is applied.
Figure 5:
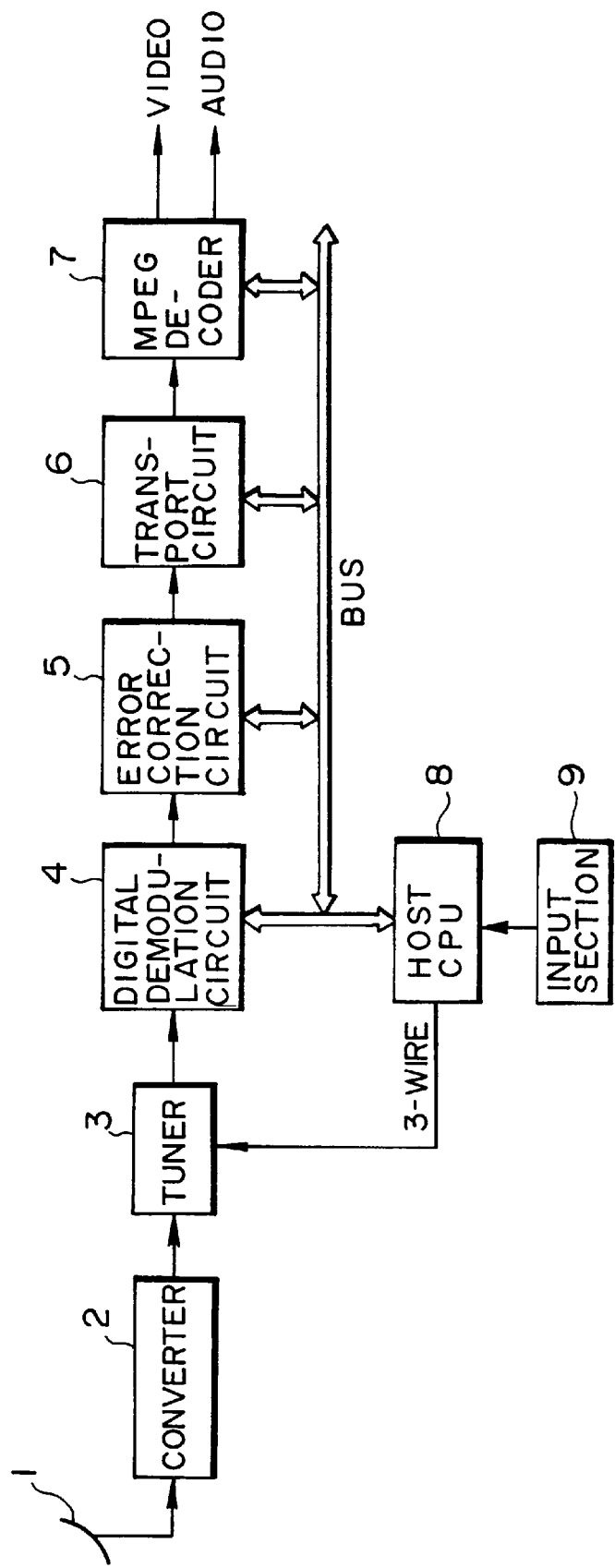
FIG. 5 is a block diagram showing the configuration of a conventional receiver.

FIG. 1 shows the configuration of a receiver to which a digital communication demodulator of the present invention is applied. In FIG. 1, component corresponding to those shown in FIG. 5 are indicated by the same reference numerals.

Basically, this receiver is also constituted of an antenna 1, a converter 2, a tuner 3, a digital demodulation circuit 4, an error correction circuit 5, a transport circuit 6, an MPEG decoder 7, a host CPU 8, and an input section 9.

The tuner 3 has a multiplier 21 which performs multiplication of an output from the converter 2 and an output from an oscillator 29, and which outputs the product thereby obtained. An AGC circuit 22 controls the output from the multiplier 21 according to a control signal from a QPSK demodulation circuit 43 in the digital demodulation circuit 4 so that the output of the multiplier 21 is maintained at a predetermined level. An output from the AGC circuit 22 is supplied to multipliers 23 and 24. The multiplier 24 performs multiplication of the output from the AGC circuit 22 and a signal of a predetermined frequency output from an oscillator 25. The multiplier 24 thereby outputs an I signal component. The multiplier 23 performs multiplication of the output from the AGC circuit 22 and a signal which is obtained by shifting the phase of the signal from the oscillator 25 by 90° with a phase shifter 26. The multiplier 23 thereby outputs a Q signal component.

A phase comparator 27 compares the phase of an output from a frequency divider 30 with the phase of a reference clock which is output from a clock generation circuit 31. The phase comparator 27 outputs to a loop filter 28 a signal corresponding to a phase error in the output from the frequency divider 30. The loop filter 28 smoothes the input phase error signal and outputs the smoothed signal to a voltage controlled oscillator 29. The voltage controlled oscillator 29 generates a signal having a phase corresponding to the control signal from the loop filter 28 and outputs the generated signal to the multiplier 21. The output from the voltage controlled oscillator 29 is also supplied to the phase comparator 27 after being frequency-divided by the frequency divider 30.

The Q and I signal components, output from the multipliers 23 and 24 of the tuner 3, are input to the A/D converters 41 and 42 of the digital demodulation circuit 4 through low-pass filters 11 and 12, respectively. The A/D converters 41 and 42 convert the input signals from the analog from into the digital form and supply the converted signals to the QPSK demodulation circuit 43. The QPSK demodulation circuit 43 demodulates each of the Q and I signal components input from the A/D converters 41 and 42 and outputs the demodulated signals to the error correction circuit 5.

The QPSK demodulation circuit 43 incorporates an automatic frequency control (AFC) circuit 44 which detects the difference between the frequency of the signal received by the tuner 3 and the receiving frequency designated by the host CPU 8, and which outputs a signal corresponding to the difference (AFC signal). This AFC signal is supplied to a format conversion circuit 53 via an adder 52 to be converted into a 3-wire format signal which is output to the frequency divider 30. A control signal in a CPU format which is output from the host CPU 8 is supplied to a CPU interface 51 via a bus and to the format conversion circuit 53 via the adder 52.

Figure 2:
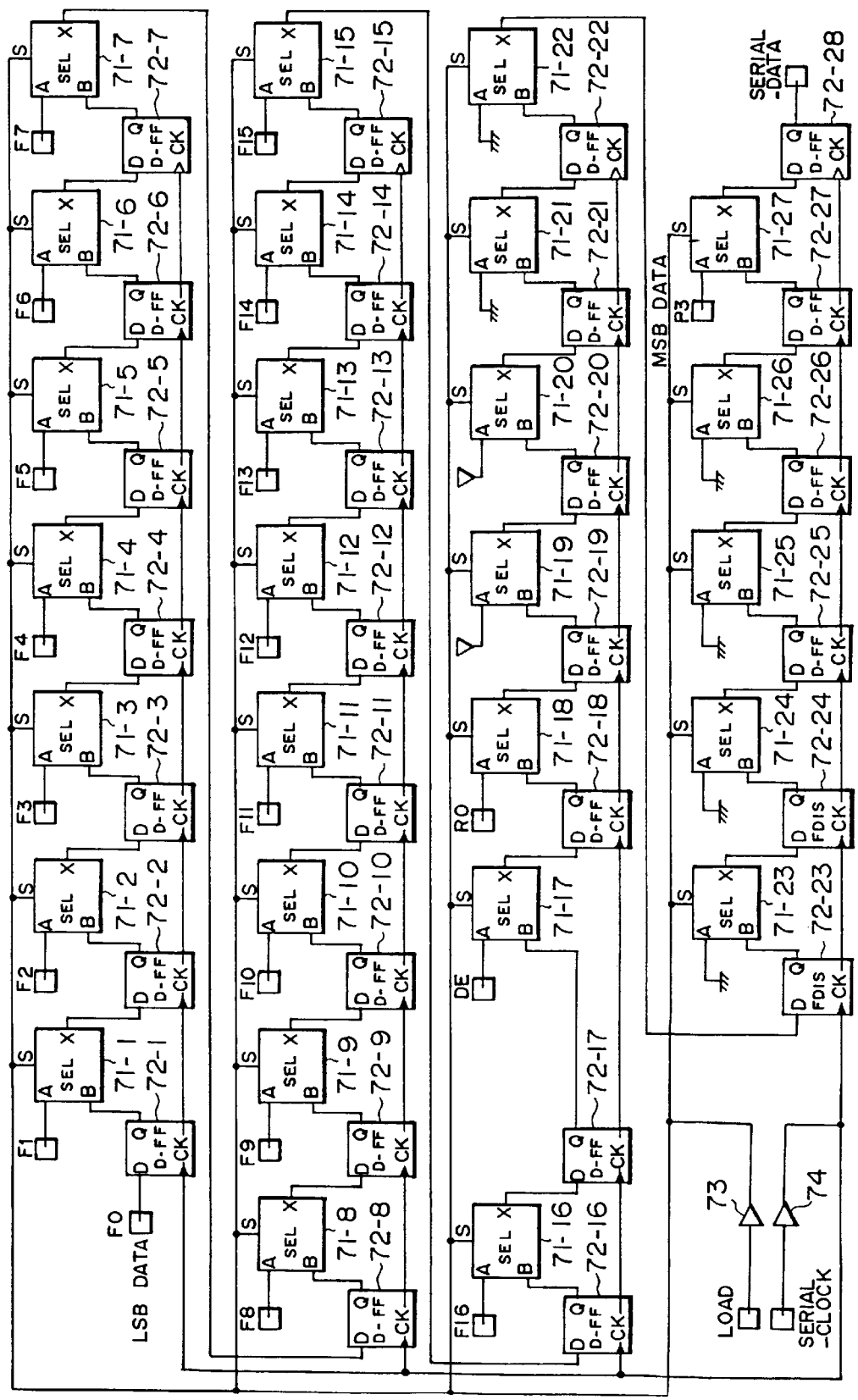
FIG. 2 is a block diagram showing the configuration of a format conversion circuit 53 shown in FIG. 1.

FIG. 2 shows the configuration of an example of the format conversion circuit 53. In this embodiment, the format conversion circuit 53 is constituted of twenty seven selectors 71-1 to 71-27 and twenty eight D-type flip-flops 72-1 to 72-28 connected in series.

In other respects, the configuration of the embodiment shown in FIG. 1 is the same as that shown in FIG. 5.

The operation of the above-described receiver will next be described. When the input section 9 is operated to instruct the host CPU 8 to receive a predetermined broadcast, the host CPU 8 outputs a control signal for receiving the broadcast to the format conversion circuit 53 via the CPU interface 51 and the adder 52. This control signal is formed of 28-bit data in the CPU format. The whole of this 28-bit data may be output from the host CPU 8. However, if some bits of the 28-bit data are fixed, the host CPU 28 may output only the bits other than the fixed bits.

In the format conversion circuit 53 shown in FIG. 2, the least significant bit (LSB) is input through a terminal F0 connected to the terminal D of the D flip-flop 72-1, and the most significant bit (MSB) is input through a terminal P3 connected to a terminal A of the selector 71-27. Terminals A of the selectors 71-19 and 71-20 are fixed at a high bit level (e.g., logical 1) while terminals A of the selectors 71-21 and 71-26 are fixed at a low bit level (e.g., logical 0).

After outputting the 28-bit control data, the host CPU 8 sets the level of a terminal LOAD to a predetermined time. A LOAD signal thereby set is input to terminals S of the selectors 71-1 to 71-27 through a buffer 73. At this time, the selectors 71-1 to 71-27 take in the corresponding bits of the control data input through the terminals A. The bits of the data are supplied from terminals X of the selectors 71-1 to 71-27 to terminals D of the D flip-flops 72-2 to 72-28 which respectively follow the selectors 71-1 to 71-27. At this time, the host CPU 8 also supplies a serial clock through a terminal SERIAL_CLOCK to make the D flip-flops 72-1 to 72-28 take in the control data bits.

Next, when the host CPU 8 sets the LOAD signal to high level, the selectors 71-1 to 71-27 select, as inputs through their terminals B, outputs from terminals Q of the D flip-flops 72-1 to 72-27 which the selectors 71-1 to 71-27 respectively follow. The selectors 71-1 to 71-27 supply these outputs to the terminals D of the D flip-flops 72-2 to 72-28 which respectively follow the selectors 71-1 to 71-27. At this time, the host CPU 8 also supplies the serial clock through the terminal SERIAL_CLOCK, so that the 28-bit control data is output in serial order from the MSB to the LSB through a terminal SERIAL_DATA.

This control data is supplied from the format conversion circuit 53 to the frequency divider 30 of the tuner 3 to set the frequency dividing ratio to a predetermined value.

The frequency divider 30 demultiplies, by a predetermined set value, the clock of a predetermined frequency output from the oscillator 29, and outputs the demultiplied clock to the phase comparator 27. The phase comparator 27 compares the phase of the signal supplied from the frequency divider 30 with the phase of the reference clock output from the clock generation circuit 31, and outputs the corresponding phase error signal. The loop filter 28 smoothes this phase error signal and outputs the smoothed signal as a control signal to the oscillator 29. The oscillator 29 generates a signal having a phase and a frequency corresponding to the control signal supplied from the loop filter 28.

The signal having a predetermined frequency set by the PLL circuit formed of the phase comparator 27, the loop filter 28, the oscillator 29 and the frequency divider 30 in the above-described manner is input to the multiplier 21 to multiply the signal supplied from the converter 2. The baseband signal of the signal of the broadcast designated by the user operating the input section 9, in the frequency-multiplexed signal supplied from the converter 2, is thereby obtained as the output from the multiplier 21. This signal is controlled at a predetermined level by the AGC circuit 22 and is thereafter input to the multipliers 23 and 24.

The multipliers 23 and 24 multiply this signal by the signals generated and output from the oscillator 25 and 90° out of phase with each other. The Q and I signal components of the QPSK-modulated signal are thereby output from the multipliers 23 and 24, respectively.

The Q and I signal components are smoothed by the low-pass filters 11 and 12 and are converted from the analog from into the digital form by the A/D converters 41 and 42 of the digital demodulation circuit 4. Thereafter, these signal components are input to the QPSK demodulation circuit 43. The QPSK demodulation circuit 43 demodulates the I and Q signal components in a QPSK demodulation manner and outputs the demodulated signals to the error correction circuit 5.

For example, the configuration of the QPSK demodulation circuit 43 may be such as that disclosed in Japanese Patent Publication No. 63-48469.

The AFC circuit 44 of the QPSK demodulation circuit 43 detects a frequency error of the input signal from the normal signal and generates an AFC signal for correcting the error. The sum (combination) of the AFC signal and the control signal from the CPU interface 51 is obtained by the adder 52 and is input to the format conversion circuit 53 to be converted into a signal in the 3-wire format, which is input to the frequency divider 30. The frequency divider 30 changes the frequency-dividing ratio according to this control signal. Thus, if there is a received frequency error from the designated frequency, the error is automatically corrected.

The QPSK demodulation circuit 43 outputs a control signal to the AGC circuit 22 such that the level of each of the signals supplied from the A/D converters 41 and 42 is at a predetermined level. The AGC circuit 22 controls the level of the signal supplied from the multiplier 21.

The error correction circuit 5 corrects the error in the signal supplied from the QPSK demodulation circuit 43 and outputs the corrected signal to the transport circuit 6. The transport circuit 6 separates the digital signal supplied from the error correction circuit 5 into audio data packets and video data packets. If the data is scrambled, it is descrambled before being output to the MPEG decoder 7. The MPEG decoder 7 decodes each of the input video and audio data and outputs the decoded data.

The host CPU 8 suitably controls the digital demodulation circuit 4, the error correction circuit 5, the transport circuit 6 and the MPEG decoder 7 through the bus.

Once the host CPU 8 outputs tuning control data to the format conversion circuit 53, the format conversion circuit 53 thereafter executes tuning control. The host CPU 8, therefore, can start any other control immediately after outputting the tuning control data.

Figure 3:
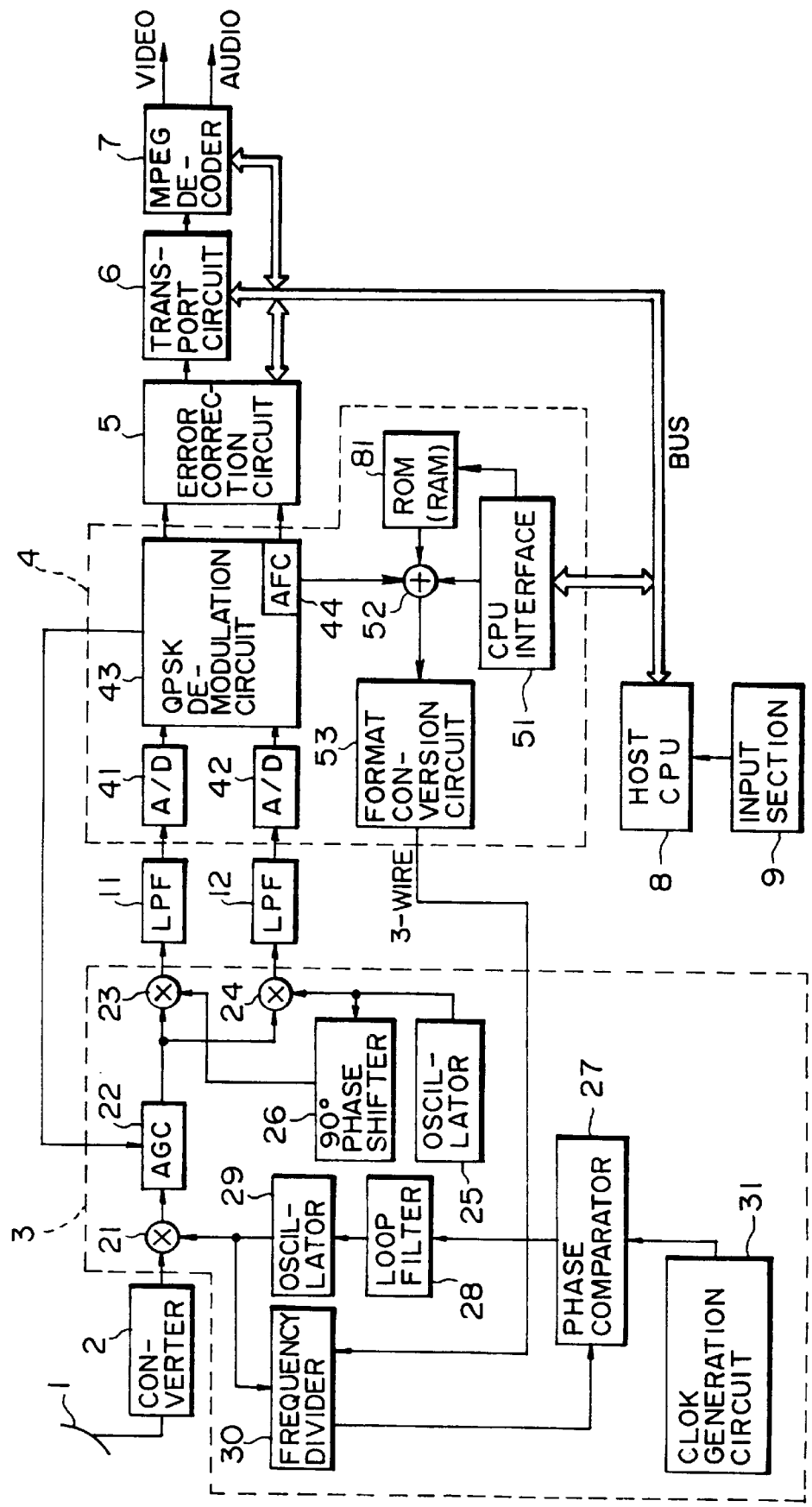
FIG. 3 is a block diagram showing the configuration of another embodiment of the receiver to which the digital communication demodulator of the present invention is applied.

FIG. 3 shows another embodiment of the present invention which differs from that shown in FIG. 1 only in that an output from the CPU interface 51 is supplied to a read only memory (ROM) 81, and in that an output from the ROM 81 is supplied to a format conversion circuit 51 via the adder 52.

In this embodiment, data on the frequencies of signals receivable by the tuner 3 is previously written in the ROM 81. Therefore, the host CPU 8 may only designate a signal for making the tuner 3 receive at one predetermined frequency in the data previously stored in the ROM 81. The number of frequency bands in which the tuner 3 receives is about 50. Accordingly, the number of necessary bits for reading out predetermined values stored in the ROM 81 by the host CPU 8 is at most eight bits.

A random access memory (RAM) may be used in place of the ROM 81. In such a case, the Host CPU 8 writes predetermined data in the RAM, for example, when the power supply is turned on. Thereafter, the host CPU 8 reads out predetermined data items from the data written in the RAM.

Figure 4:
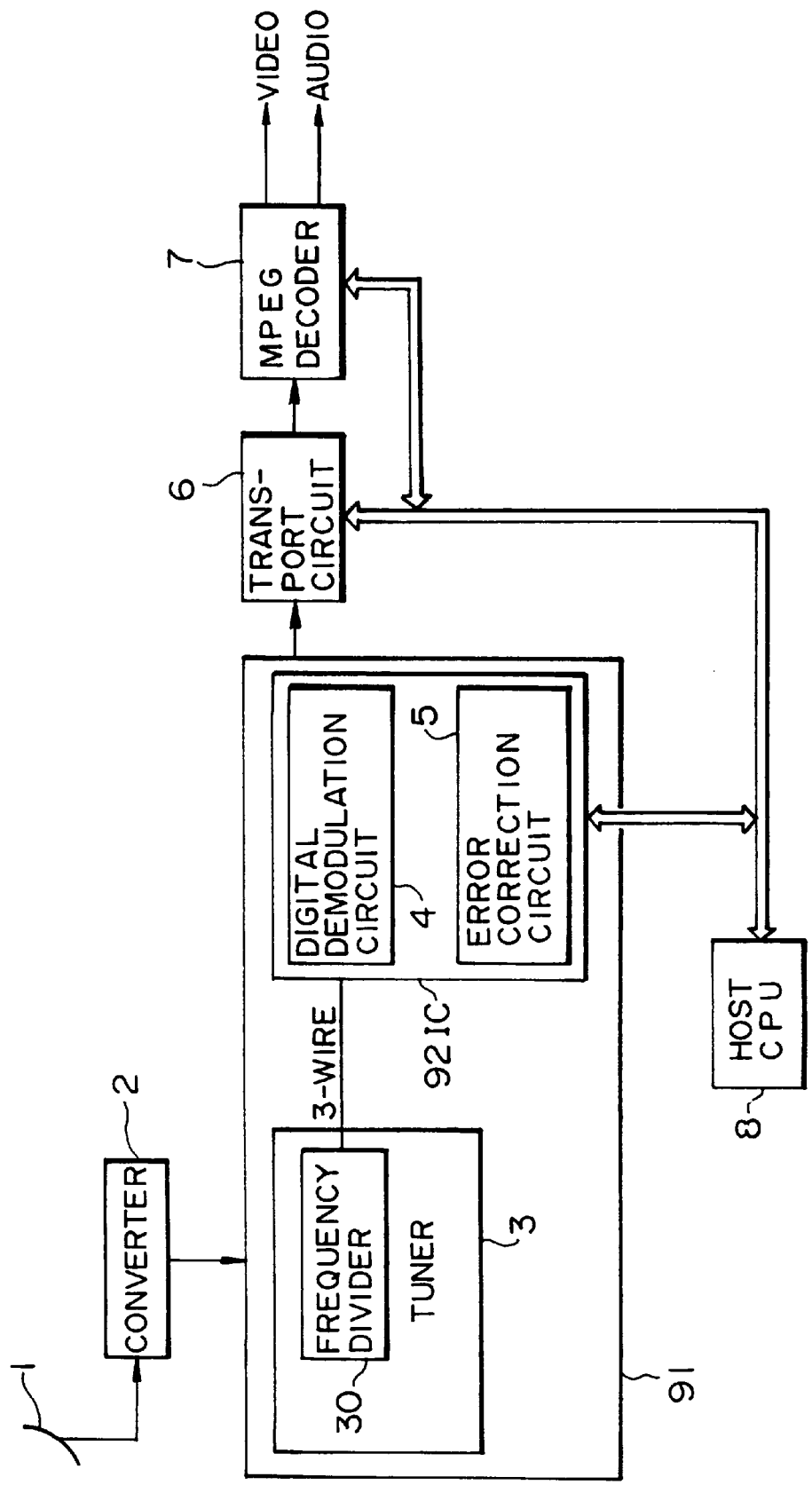
FIG. 4 is a block diagram showing the configuration of still another embodiment of the receiver to which the digital communication demodulator of the present invention is applied.

FIG. 4 shows still another embodiment of the present invention, in which the digital demodulation circuit 4 and the error correction circuit 5 are incorporated in one integrated circuit (IC) 92. The tuner 3 and the IC 92 are accommodated in one metallic package to form a tuner pack 91. The tuner 3 and the IC 92 are connected in accordance with the 3-wire format on a substrate of the tuner pack 91. The host CPU 8 accesses the IC 92 through a bus and controls the tuner 3 through the IC 92.

The facility with which the components are handled is improved by using such a construction.

As tuner 3 in the 3-wire format, the MS12210 from Motorola (trade name), which is a serial input PLL frequency synthesizer, or the 2.7 GHz Low Phase Noise Frequency Synthesizer SP5658 from GEC Plessey Semiconductors (trade name), for example, may be used.

Products controllable by a simple 3-wire system and usable as the tuner 3 have already been put on the market, and one of such products may be directly put to use to provide the apparatus of the present invention at a low cost.

The present invention has been described with respect to an application to a receiver for receiving broadcasts from a broadcasting satellite. However, the present invention is not limited to the above-described application and can also be applied to any other apparatus for extracting a signal in one frequency band from a received frequency-multiplexed signal.

In the digital communication demodulator and the digital communication demodulation method of the present invention, the format of a control signal of the control means for designating a frequency band in which the extraction means extracts a signal is converted into the format of the extraction means before it is output to the extraction means. Thus, the apparatus can be simply arranged so to as reduce the load on the CPU.

What is claimed is:

1. A digital communication demodulator comprising:

extraction means for extracting a signal in a designated frequency band from a signal in which signals in a plurality of frequency bands are frequency-multiplexed;

demodulation means for digitally demodulating a signal in a predetermined frequency band extracted by said extraction means; and control means for controlling said extraction means and said demodulation means with control signals in a predetermined format, wherein said demodulation means includes conversion means having a plurality of selectors and a plurality of bi-state means for converting the format of one of the control signals of said control means designating a frequency band extracted by said extraction means into a format of said extraction means, and for outputting the format-converted control signal to said extraction means.

2. A digital communication demodulator according to claim 1, said demodulation means further including:

detection means for detecting a frequency error of the signal extracted by said extraction means and for outputting a signal corresponding to the error; and combining means for combining the signal output from said detection means and the control signal of said control means and for supplying the combined signal to said conversion means.

3. A digital communication demodulator according to claim 1, further comprising storage means for storing a relationship between the control signal of said control means designating a frequency band extracted by said extraction means and a value set by said extraction means with respect to the control signal, and for outputting the set value corresponding to the control signal.

4. A digital communication demodulator according to claim 1, further comprising:

error correction means for correcting an error in an output from said demodulation means;

separation means for separating audio data and video data from an output from said error correction means; and decoding means for decoding the audio data and the video data separated by said separation means.

5. A digital communication demodulator according to claim 4, wherein said control means comprises a central processing unit which controls said demodulation means, said error correction means and said separation means through a bus, and wherein said conversion means converts the format of a control signal of said central processing unit into a 3-wire format of said extraction means.

6. A method for processing in a digital communication demodulator, said method comprising the steps of:

extracting a signal in a designated frequency band from a signal in which signals in a plurality of frequency bands are frequency-multiplexed;

digitally demodulating a signal in a predetermined frequency band extracted in said extraction step; and controlling processing in said extraction and demodulation steps with control signals in a predetermined format, wherein said demodulation step includes converting via a plurality of selectors and a plurality of bi-state means the format of one of the control signals in said control step designating a frequency band extracted in said extraction step into a format of said extraction step, and outputting the format-converted control signal for processing in said extraction step.

7. A method according to claim 6, wherein said demodulation step further includes:

detecting a frequency error of the signal extracted in said extraction step and outputting a signal corresponding to the error; and combining the signal output in said detection step and the control signal of said control step and supplying the combined signal for processing in said conversion step.

8. A method according to claim 6, further comprising the step of storing a relationship between the control signal of said control step designating a frequency band extracted in said extraction step and a value set in said extraction step with respect to the control signal, and outputting the set value corresponding to the control signal.

9. A method according to claim 6, further comprising the steps of:

correcting an error in an output from said demodulation step;

separating audio data and video data from the output corrected in said error correction step; and decoding the audio data and the video data separated in said separation step.

10. A digital communication circuit for digitally demodulating a signal in a designated frequency band extracted by a tuner from a signal in which signals in a plurality of frequency bands are frequency-multiplexed, said digital communication circuit comprising:

an analog-to-digital conversion circuit for performing analog-to-digital conversion of an I signal component and a Q signal component supplied from the tuner;

a demodulation circuit for demodulating a signal output from said analog-to-digital conversion circuit in a quadrature phase-shift keying manner;

an interface to which a control signal is supplied from an external circuit;

a format conversion circuit having a plurality of selectors and a plurality of bi-state means for converting the format of the control signal from said interface and for outputting the format-converted control signal; and an output section for outputting the format-converted control signal.

11. A digital communication circuit according to claim 10, further comprising:

an automatic frequency control circuit for detecting the difference between the frequency of a signal received by said tuner and a frequency designated by said external circuit, and for outputting a detection signal corresponding to the difference; and a combining circuit for combining the detection signal and the control signal from said external circuit and for supplying the combined signal to said format conversion circuit.

12. A digital communication circuit according to claim 10, further comprising:

a storage circuit for storing a relationship between the control signal from said external circuit designating a frequency band extracted by said tuner and a value set by said tuner with respect to the control signal, and for outputting the set value corresponding to the control signal; and a combining circuit for combining the control signal from said external circuit and the set value read out from said storage circuit according to the control signal from said external circuit, and for supplying the combined signal to said format conversion circuit.

13. A digital communication demodulator comprising:

extraction means for extracting a signal in a designated frequency band from a signal in which signals in a plurality of frequency bands are frequency-multiplexed;

demodulation means for digitally demodulating a signal in a predetermined frequency band extracted by said extraction means, said demodulation means including detection means for detecting a frequency error of the signal extracted by said extraction means and for outputting a signal corresponding to the error; and control means for controlling said extraction means and said demodulation means with control signals in a predetermined format, wherein said demodulation means further includes combining means for combining the signal output from said detection means and the control signal of said control means to generate a combined signal, and conversion means for receiving the combined signal, for converting the format of one of the control signals of said control means designating a frequency band extracted by said extraction means into a format of said extraction means and for outputting the format-converted control signal to said extraction means.

14. A digital communication demodulator according to claim 13, further comprising storage means for storing a relationship between the control signal of said control means designating a frequency band extracted by said extraction means and a value set by said extraction means with respect to the control signal, and for outputting the set value corresponding to the control signal.

15. A digital communication demodulator according to claim 13, further comprising:

error correction means for correcting an error in an output from said demodulation means;

separation means for separating audio data and video data from an output from said error correction means; and decoding means for decoding the audio data and the video data separated by said separation means.

16. A digital communication demodulator according to claim 15, wherein said control means comprises a central processing unit which controls said demodulation means, said error correction means and said separation means through a bus, and wherein said conversion means converts the format of a control signal of said central processing unit into a 3-wire format of said extraction means.

17. A method for processing in a digital communication demodulator, said method comprising the steps of:
- extracting a signal in a designated frequency band from a signal in which signals in a plurality of frequency bands are frequency-multiplexed;
- digitally demodulating a signal in a predetermined frequency band extracted in said extraction step, said demodulating including detecting a frequency error of the signal extracted in said extraction step and outputting a signal corresponding to the error; and
- controlling processing in said extraction and demodulation steps with control signals in a predetermined format,
- wherein said demodulating step includes combining the signal output in said detecting step and the control signal and supplying the combined signal for processing, converting the format of one of the control signals designating an extracted frequency band into a format of the extracting step, and outputting the format-converted control signal for controlling the extraction processing.

18. A method according to claim 17, further comprising the step of storing a relationship between the control signal of said control step designating a frequency band extracted in said extraction step and a value set in said extraction step with respect to the control signal, and outputting the set value corresponding to the control signal.

19. A method according to claim 17, further comprising the steps of:
- correcting an error in an output from said demodulation step;
- separating audio data and video data from the output corrected in said error correction step; and
- decoding the audio data and the video data separated in said separation step.

20. A digital communication circuit for digitally demodulating a signal in a designated frequency band extracted by a tuner from a signal in which signals in a plurality of frequency bands are frequency-multiplexed, said digital communication circuit comprising:
- an analog-to-digital conversion circuit for performing analog-to-digital conversion of an I signal component and a Q signal component supplied from the tuner;
- a demodulation circuit for demodulating a signal output from said analog-to-digital conversion circuit in a quadrature phase-shift keying manner;
- an interface to which a control signal is supplied from an external circuit;
- an automatic frequency control circuit for detecting the difference between the frequency of a signal received by said tuner and a frequency designated by said external circuit, and for outputting a detection signal corresponding to the difference;
- a combining circuit for combining the detection signal and the control signal from said external circuit to generate a combined signal;
- a format conversion circuit for receiving said combined signal, converting the format of the control signal from said interface, and outputting the format-converted control signal; and
- an output section for outputting the format-converted control signal.

21. A digital communication circuit according to claim 20, further comprising:
- a storage circuit for storing a relationship between the control signal from said external circuit designating a frequency band extracted by said tuner and a value set by said tuner with respect to the control signal, and for outputting the set value corresponding to the control signal; and
- a combining circuit for combining the control signal from said external circuit and the set value read out from said storage circuit according to the control signal from said control circuit, and for supplying the combined signal to said format conversion circuit.

* * * * *